(12) United States Patent
Maezawa (10) Patent No.: US 11,600,252 B2
(45) Date of Patent: Mar. 7, 2023

(54) PERFORMANCE ANALYSIS METHOD (71) Applicant: YAMAHA CORPORATION, Hamamatsu (JP)

(72) Inventor: Akira Maezawa, Hamamatsu (JP)

(73) Assignee: YAMAHA CORPORATION, Hamamatsu (JP)

( * ) Notice: Subject to any disclaimer, the term of this patent is extended or adjusted under 35 U.S.C. 154(b) by 429 days.

(21) Appl. No.: 16/751,694

(22) Filed: Jan. 24, 2020

(65) Prior Publication Data

US 2020/0160820 A1  May 21, 2020

Related U.S. Application Data (63) Continuation of application No. PCT/JP2018/027837, filed on Jul. 25, 2018.

(30) Foreign Application Priority Data

Jul. 25, 2017  (JP) .............................. JP2017-143981

(51) Int. Cl.
*G06N 3/08* (2006.01)
*G10H 1/00* (2006.01)
(Continued)

(52) U.S. Cl.
CPC ......... *G10H 1/0008* (2013.01); *G06N 3/0472* (2013.01); *G06N 3/08* (2013.01); *G06N 5/04* (2013.01); *G10H 2210/091* (2013.01)

(58) Field of Classification Search
CPC ........... G10H 1/0008; G10H 2210/091; G10H 1/40; G10H 2210/165; G10H 2210/385; G10H 2210/241; G10H 2250/311; G10H 2210/031; G10H 1/0066; G10H 1/0091; G10H 1/043; G10H 1/00; G09B 15/00; (Continued)

(56) References Cited

U.S. PATENT DOCUMENTS

| 6,236,966 B1 * | 5/2001 | Fleming ................. G10L 13/08 |
| | | 704/E13.011 |
| 6,297,439 B1 | 10/2001 | Browne |

(Continued)

FOREIGN PATENT DOCUMENTS

| JP | H09237088 A | 9/1997 |
| JP | 2006030414 A | 2/2006 |
| WO | 2010095622 A1 | 8/2010 |

OTHER PUBLICATIONS

Weninger. "On-Line Continuous-Time Music Mood Regression with Deep Recurrent Neural Networks." IEEE International Conference on Acoustic, Speech and Signal Processing (ICASSP) 2014. May 4, 2014. pp. 5412-5416. Cited in NPL 2 and NPL 3.

(Continued)

*Primary Examiner* — Huyen X Vo
(74) *Attorney, Agent, or Firm* — Rossi, Kimms & McDowell LLP (57) ABSTRACT

A performance analysis method according to the present invention includes generating information related to a performance tendency of a user, from observed performance information relating to a performance of a musical piece by the user and inferred performance information that occurs when the musical piece is performed based on a specific tendency.

5 Claims, 5 Drawing Sheets

(51) Int. Cl.
*G06N 3/04* (2023.01)
*G06N 5/04* (2023.01)

(58) Field of Classification Search
CPC .......... G06N 3/0472; G06N 3/04; G06N 3/08; G06N 5/04; G06N 3/02; G06N 3/0454; G06N 7/005; G06N 7/00; G04F 5/02; G10G 1/00
See application file for complete search history.

(56) References Cited

U.S. PATENT DOCUMENTS

| | | | |
|---|---|---|---|
| 2006/0011047 A1* | 1/2006 | Ohmura | G10H 1/06 84/622 |
| 2007/0039450 A1* | 2/2007 | Ohshima | G10H 5/005 84/616 |
| 2012/0046771 A1 | 2/2012 | Abe | |
| 2013/0305904 A1* | 11/2013 | Sumi | G10H 1/0008 84/609 |
| 2014/0238220 A1* | 8/2014 | Nakamura | G10H 1/38 84/613 |

OTHER PUBLICATIONS

International Search Report issued in Intl. Appln. No. PCT/JP2018/027837 dated Sep. 11, 2018. English translation provided.
Written Opinion issued in Intl. Appln. No. PCT/JP2018/027837 dated Sep. 11, 2018.

* cited by examiner

PERFORMANCE ANALYSIS METHOD

TECHNICAL FIELD

The present invention relates to a technology for analyzing the performance of a musical piece.

BACKGROUND ART

Patent Literature 1, for example, discloses a technology for changing the tone of any given musical instrument to the tone of another musical instrument within the performance sound of a musical piece, by processing an acoustic signal representing the performance sound. Also, Patent Literature 1 discloses a technology for generating an acoustic signal imparted with a specific musical expression.

CITATION LIST

Patent Literature

Patent Literature 1: WO2010/095622

SUMMARY

In the actual performance of a musical piece, the performance sound is colored by tendencies (musical expressions or performance mannerisms) unique to the performers. If the tendencies of a performance by a performer can be inferred, the processing for imparting a specific musical expression according to Patent Literature 1 can be realized for segments performed with a specific tendency within the musical piece, for example. In consideration of the above circumstances, an object of the present invention is to infer the tendencies of a performance by a performer.

In order to solve the above problems, a performance analysis method according to a favorable mode of the present invention includes generating information related to a performance tendency of a user, from observed performance information relating to a performance of a musical piece by the user and inferred performance information that occurs when the musical piece is performed based on a specific tendency.

A performance analysis method according to a favorable mode of the present invention includes a storage unit that stores musical piece information representing contents of a musical piece and a control unit, the control unit being configured to execute generating information related to a performance tendency of a user, from observed performance information relating to a performance of a musical piece by the user and inferred performance information that occurs when the musical piece is performed based on a specific tendency.

A storage medium according to a favorable mode of the present invention is a non-transitory storage medium storing a program readable by a computer, configured to cause the computer to execute generating information related to a performance tendency of a user, from observed performance information relating to a performance of a musical piece by the user and inferred performance information that occurs when the musical piece is performed based on a specific tendency.

Also, a program according to a favorable mode of the present invention causes a computer to execute generating information related to a performance tendency of a user, from observed performance information relating to a performance of a musical piece by the user and inferred performance information that occurs when the musical piece is performed based on a specific tendency.

DESCRIPTION OF EMBODIMENTS

First Embodiment

Figure 1:
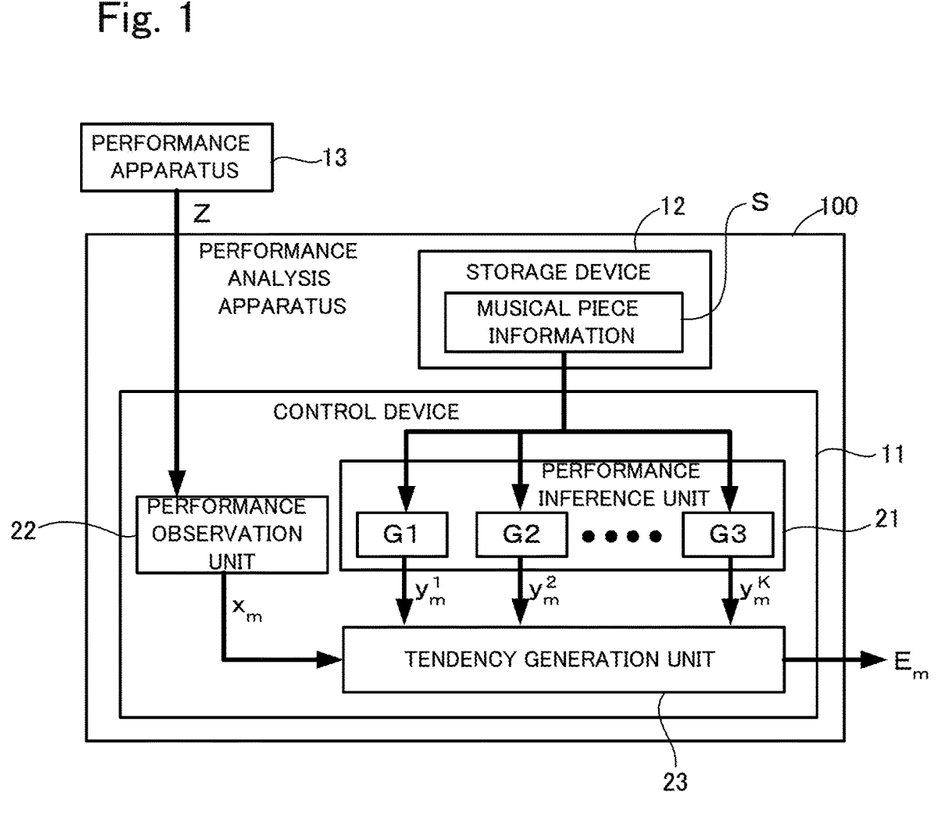
FIG. 1 is a block diagram showing a configuration of a performance analysis apparatus according to a first embodiment of the present invention.

FIG. 1 is a block diagram showing the configuration of a performance analysis apparatus 100 according to a first embodiment of the present invention. As illustrated in FIG. 1, the performance analysis apparatus 100 of the first embodiment is realized by a computer system equipped with a control device 11, a storage device 12, and a performance apparatus 13. Various types of devices such as a personal computer, for example, can be utilized as the performance analysis apparatus 100.

The control device 11 includes a processing circuit such as a CPU (Central Processing Unit), for example. The control device 11 is realized by a single or multiple chips (processors), for example. The storage device 12 stores a computer program that is executed by the control device 11 and various types of data that are used by the control device 11. For example, a known recording medium such as a semiconductor recording medium or magnetic recording medium or a combination of multiple types of recording media can be freely employed as the storage device 12.

The storage device 12 of the present embodiment stores musical piece information S representing the contents of a musical piece. This musical piece information S designates the pitch, intensity and sounding period (sounding time and continuation length) for each of a plurality of notes constituting the musical piece. The musical piece information S can be configured in various forms, and, for example, a file (SMF: Standard MIDI File) in MIDI (Musical Instrument Digital Interface) format in which instruction data that designates the pitch and intensity and instructs sounding or silencing and time data that designates the sounding time point of each instruction data are arrayed in time series is a favorable example of the musical piece information S.

Figure 2:
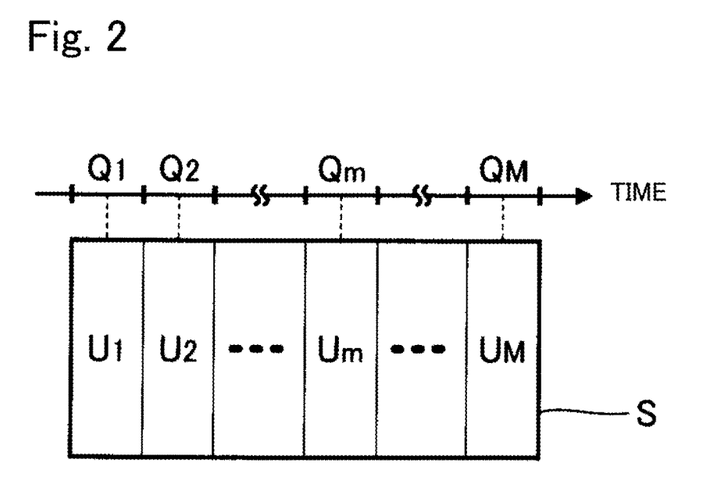
FIG. 2 is a schematic diagram of musical piece information and unit information.

As illustrated in FIG. 2, the musical piece information S is divided into a plurality (M) of portions (hereinafter, "unit information") $U_1$ to $U_M$. Any one piece of unit information $U_m$ (m=1 to M) designates the contents of the performance within an mth unit period $Q_m$ out of M unit periods $Q_1$ to $Q_M$ obtained by dividing the musical piece along the time axis. That is, the unit information $U_m$ designates the pitch, intensity and sounding period for each of one or more notes included in the unit period $Q_m$ of the musical piece. Each unit period $Q_m$ is a period of a duration corresponding to a predetermined note value (e.g., quaver) of the musical piece, for example.

The performance apparatus 13 in FIG. 1 is an input device that is utilized by a user in performing a musical piece. For example, a keyboard instrument-type performance device (e.g., MIDI instrument) in which a plurality of keys that are operated by the user are arrayed can be favorably utilized, but other instruments are also possible. The performance apparatus 13 sequentially outputs instruction information Z in conjunction with an operation by the user. The instruction information Z is generated for each of the plurality of notes constituting the musical piece, and is data (e.g., MIDI event data) that designates the pitch and intensity of the notes and instructs sounding or silencing.

The performance analysis apparatus 100 of the first embodiment infers a tendency (hereinafter, "performance tendency") $E_m$ of the performance that occurs when the user performs the musical piece with the performance apparatus 13. The performance tendency $E_m$ is a musical expression or performance mannerism unique to a performer. Generation of the performance tendency $E_m$ is executed for every unit period $Q_m$. The time series of M performance tendencies $E_1$ to $E_M$ corresponding to different unit periods $Q_m$ signifies the temporal transition of the performance tendency that occurs when the user performs the musical piece. The performance analysis apparatus 100 of the first embodiment infers one of a plurality of different types (K types) of performance tendencies (hereinafter, "candidate tendencies") as the performance tendency $E_m$ of the user.

As illustrated in FIG. 1, the control device 11 of the first embodiment, by executing the program stored in the storage device 12, functions as a plurality of elements (performance inference unit 21, performance observation unit 22 and tendency generation unit 23) for inferring the performance tendency $E_m$ from the instruction information Z. Note that some of the functions of the control device 11 may be realized by a dedicated electronic circuit.

As illustrated in FIG. 1, the performance inference unit 21 generates K pieces of inferred performance information $y_m^1$ to $y_m^K$ corresponding to different candidate tendencies $C_k$ (k=1 to K). Inferred performance information $y_m^k$ corresponding to a candidate tendency $C_k$ is a variable relating to that candidate tendency $C_k$. The inferred performance information $y_m^k$ of the first embodiment is, for example, the performance speed (tempo) that occurs when the musical piece is performed based on the candidate tendency $C_k$. The K pieces of inferred performance information $y_m^1$ to $y_m^K$ are generated for every unit period $Q_m$. That is, the inferred performance information $y_m^k$ can change every unit period $Q_m$.

As described above, in the case where performance speed (tempo) is selected as the performance tendency, candidate tendencies $C_k$ include, for example, (i) speed becomes gradually faster, (ii) speed becomes gradually slower, (iii) speed is variable, (iv) speed is steady (flat), and the like in the unit period $Q_m$, and K types of such candidate tendencies $C_k$ are set.

The performance inference unit 21 of the first embodiment is, as illustrated in FIG. 1, equipped with K performance information generation units $G_1$ to $G_K$ corresponding to the different candidate tendencies $C_k$. Any one of the performance information generation units $G_k$ generates inferred performance information $y_m^k$ corresponding to a candidate tendency $C_k$ for every unit period $Q_m$ from the musical piece information S.

Figure 3:
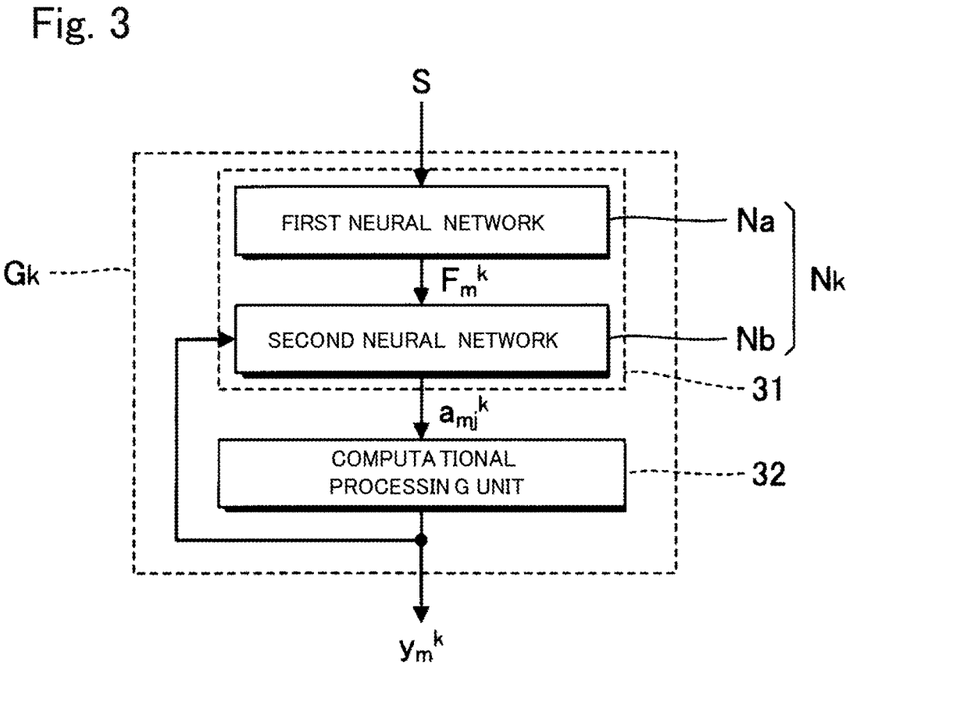
FIG. 3 is a block diagram showing a configuration of a performance information generation unit.

FIG. 3 is a block diagram showing the configuration of anyone of the performance information generation units $G_k$. As illustrated in FIG. 3, the performance information generation unit $G_k$ of the first embodiment is provided with a coefficient generation unit 31 and a computational processing unit 32.

The inferred performance information $y_m^k$ of the first embodiment is generated by an autoregressive process represented by the following equation (1).

$$y_m^k = \sum_{j=1}^{P} a_{mj}^k y_{m-j}^k \qquad (1)$$

The coefficient generation unit 31 in FIG. 3 generates a linear predictor coefficient (autoregressive coefficient) $a_{mj}^k$ of the unit period $Q_m$ from the musical piece information S. The coefficient generation unit 31 of the performance information generation unit $G_k$ includes a neural network (learner) $N_k$ in which the candidate tendency $C_k$ is reflected. The neural network $N_k$ is a mathematical model in which a model parameter $\theta_k$ ($\theta a$, $\theta b$) is set by machine learning that utilizes a large amount of training data that aligns with the candidate tendency $C_k$. Specifically, the model parameter $\theta_k$ is set such that the error between the inferred performance information $y_m^k$ that is calculated by equation (1) and performance information (training data) representing a performance that aligns with the candidate tendency $C_k$ is minimized. Accordingly, the neural network $N_k$ of the first embodiment outputs a linear predictor coefficient $a_{mj}^k$ ($a_{m1}^k$, $a_{m2}^k$, $a_{m3}^k$, ..., $a_{mP}^k$) appropriate for the musical piece information S based on the candidate tendency $C_k$ that is extracted from the large amount of training data utilized in the machine learning.

That is, this neural network $N_k$ learns using training data that is based on the performance by a predetermined performer, so as to be able to predict (output) the performance information $y_m^k$ of the unit period $Q_m$, from the musical piece information S and the performance information of at least one past unit period $Q_m$ or more prior to the unit period $Q_m$. That is, the K neural networks $N_k$ include a representation learned by training data including a candidate tendency indicating that the tempo becomes gradually slower and a representation learned by training data including a candidate tendency indicating that the tempo becomes gradually faster, such as described above. Note that training data can be generated by various methods, and can, for example, be generated, based on a performance by one specific performer, a performance by a specific performer (or typical performer) in a musical piece of a specific genre, or the like.

As illustrated in FIG. 3, the neural network $N_k$ of the first embodiment is constituted by a first neural network (first learner) Na and a second neural network (second learner) Nb. The first neural network Na and the second neural network Nb are, for example, both convolutional neural networks (CNN) in which batch normalization layers and fully connected layers are connected to a stack of a plurality of layers including convolutional layers and maximum pooling layers. A Leaky ReLU (Rectified Linear Unit) is suitable for the activating function. The structure of the neural network N (Na, Nb) and the type of activating function are, however, not particularly limited.

Figure 4:
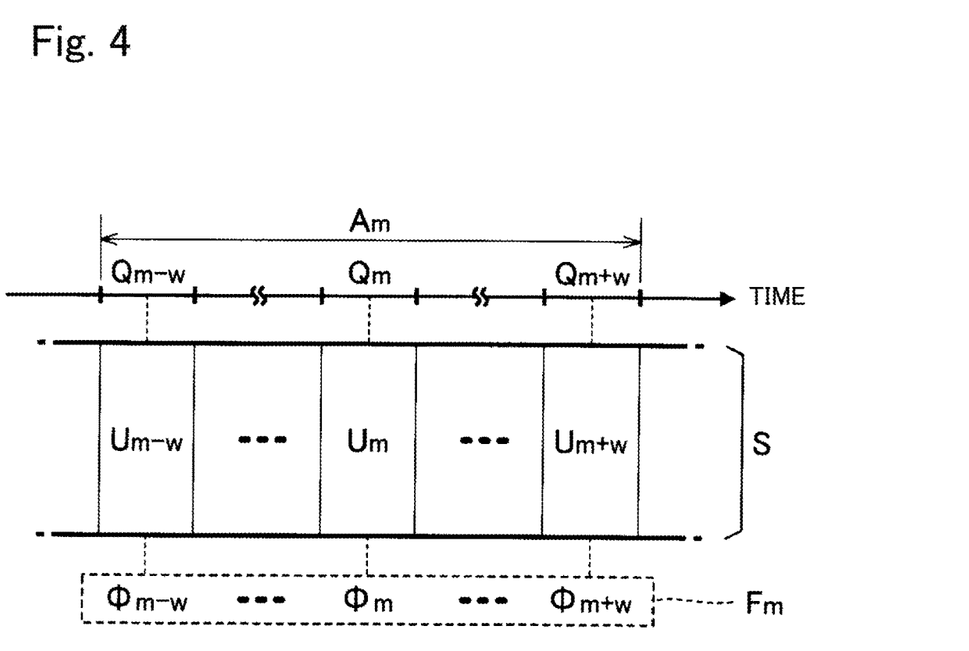
FIG. 4 is an illustrative diagram of feature information.

The first neural network Na, as illustrated in FIG. 4, generates feature information $F_m^k$ of the unit period $Q_m$ (example of one unit period) from the musical piece information S in order to generate the linear predictor coefficient $a_{mj}^k$. Specifically, the first neural network Na generates the feature information $F_m^k$ of the unit period $Q_m$ from plural (2W+1) pieces of unit information $U_{m-w}$ to $U_{m+w}$ corresponding to an analysis period $A_m$ including the unit period $Q_m$, with the musical piece information S as an input. The analysis period $A_m$ is a period from a past (prior) unit period $Q_{m-w}$ of the unit period $Q_m$ to a later unit period $Q_{m+w}$.

As illustrated in FIG. 4, the feature information $F_m^k$ is a series of a plurality of feature amounts $\varphi_{m-w}$ to $\varphi_{m+w}$ respectively corresponding to plural pieces of unit information $U_{m-w}$ to $U_{m+w}$ within the analysis period $A_m$. The model parameter $\theta a$ of the first neural network Na is set by machine learning that utilizes a large amount of training data including feature information and a time series of plural pieces of unit information. Accordingly, the first neural network Na outputs feature information $F_m^k$ appropriate for plural pieces of unit information $U_{m-w}$ to $U_{m+w}$ based on the tendency that is extracted from the large amount of training data. The feature information $F_m^k$ is equivalent to information that summarizes the musical features of the performance contents within the analysis period $A_m$. Specifically, feature information $F_m^k$ representing various types of musical expressions is generated in addition to a time series of notes within the musical piece. As musical expressions (contexts) that are reflected in the feature information $F_m^k$, a key signature within the musical piece, the position of a beat point, a dynamic marking (e.g., crescendo) and a tempo marking (e.g., ritardando) are given as examples.

The second neural network Nb in FIG. 3 outputs the linear predictor coefficient $a_{mj}^k$ of the unit period $Q_m$, with the feature information $F_m^k$ generated by the first neural network Na and P pieces of inferred performance information $y_{m-1}^k$ to $y_{m-P}^k$ (where P is a natural number of 2 or more) of a period prior to the unit period $Q_m$ as inputs. The model parameter $\theta b$ of the second neural network Nb is set by machine learning that utilizes a large amount of training data including a linear predictor coefficient and a vector that includes feature information and a time series of plural pieces of performance information.

Accordingly, the second neural network Nb outputs a linear predictor coefficient $a_{mj}$ appropriate for the P pieces of inferred performance information $y_{m-1}^k$ to $y_{m-P}^k$ and the feature information $F_m^k$ based on the target tendency $C_k$. That is, the second neural network Nb has learned, such that the tendency of a predetermined performance is included in the linear predictor coefficient $a_{mj}^k$ that serves as an output.

The computational processing unit 32 of FIG. 3 generates the inferred performance information $y_m^k$ of the unit period $Q_m$, by executing the computation of the aforementioned equation (1) for the linear predictor coefficient generated by the coefficient generation unit 31 and the past P pieces of inferred performance information $y_{m-1}^k$ to $y_{m-P}^k$. In this way, in the first embodiment, the inferred performance information $y_m^k$ of the unit period $Q_m$ is output, based on the past P pieces of inferred performance information $y_{m-1}^k$ to $y_{m-P}^k$ prior to the unit period $Q_m$, and the output inferred performance information $y_m^k$ is fed back as an input of the second neural network Nb. That is, the inferred performance information $y_{m+1}^k$ of the next unit period $Q_{m+1}$ is predicted by the second neural network Nb, based on the inferred performance information $y_m^k$ to $y_{m-P}^k$ to which the inferred performance information $y_m^k$ has been added. This processing is then successively repeated.

As is clear from the above description, the performance information generation unit $G_k$ of the first embodiment, generates, for the unit period $Q_m$, inferred performance information $y_m^k$ in which the candidate tendency $C_k$ is reflected, by providing the musical piece information S (plural pieces of unit information $U_{m-w}$ to $U_{m+w}$) and the past P pieces of inferred performance information $y_{m-1}^k$ to $y_{m-P}^k$ to the neural network $N_k$. Processing for generating the inferred performance information $y_m^k$ from the feature information $F_m^k$ corresponding to the unit period $Q_m$ and the past P pieces of inferred performance information $y_{m-1}^k$ to $y_{m-P}^k$ is sequentially executed in time-series order for each of the M unit periods $Q_1$ to $Q_M$ within the musical piece. The time series of M pieces of inferred performance information $y_1^k$ to $y_m^k$ that is generated by the performance information generation unit $G_k$ with the above processing is equivalent to the temporal change in performance speed that occurs when the musical piece is performed based on the candidate tendency $C_k$.

As is clear from the above description, the performance inference unit 21 of the first embodiment generates inferred performance information $y_m^k$ that occurs when the musical piece is performed based on each candidate tendency $C_k$, by providing the musical piece information S to each of the K neural networks $N_1$ to $N_K$ in which the different candidate tendencies $C_k$ are reflected.

The performance observation unit 22 in FIG. 1 sequentially generates observed performance information $x_m$ ($x_1$ to $x_M$) from the time series of the plural pieces of instruction information Z that is supplied by the performance apparatus 13. The observed performance information $x_m$ is a variable relating to a tendency of the performance of a musical piece. The observed performance information $x_m$ of the first embodiment is the performance speed of the musical piece, similarly to the inferred performance information $y_m^k$. The observed performance information $x_m$ is sequentially generated for every unit period $Q_m$. That is, the observed performance information $x_m$ can change every unit period $Q_m$. As is clear from the above description, inferred performance information $y_m^k$ corresponding to a candidate tendency $C_k$ that is similar to the performance tendency of the user, among the K pieces of inferred performance information $y_m^1$ to $y_m^K$, has the tendency of being similar to the observed performance information $x_m$ that is generated by the performance observation unit 22.

Figure 5:
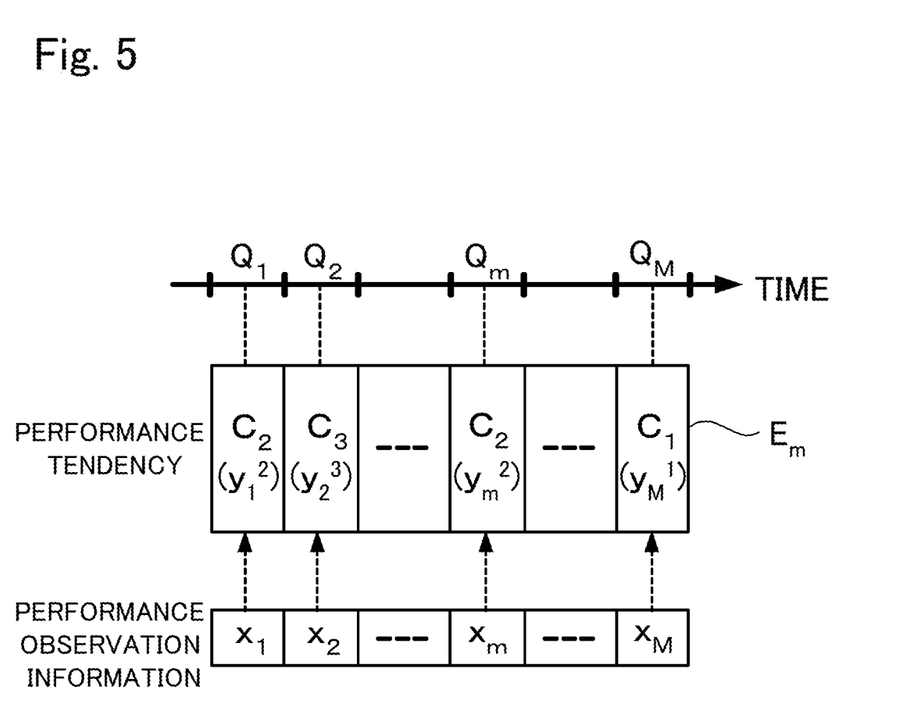
FIG. 5 is an illustrative diagram of a performance tendency.

The tendency generation unit 23 infers the performance tendency $E_m$ of the user from the K pieces of inferred performance information $y_m^1$ to $y_m^K$ generated by the performance inference unit 21 and the observed performance information $x_m$ generated by the performance observation unit 22. Specifically, the tendency generation unit 23 compares each of the K pieces of inferred performance information $y_m^1$ to $y_m^k$ with the observed performance information $x_m$. The tendency generation unit 23 then generates candidate tendency $C_k$ corresponding to the inferred performance information $y_m^k$ that is similar to the observed performance information $x_m$ among the K pieces of inferred performance information $y_m^1$ to $y_m^K$ as the performance tendency $E_m$ of the user. Generation of the performance tendency $E_m$ by the tendency generation unit 23 is sequentially executed for every unit period $Q_m$. Accordingly, a performance tendency $E_m$ such as shown in FIG. 5 is generated, for example. In the example shown in FIG. 5, performance tendencies $E_m$ with respect to which candidate tendencies $C_2$ (inferred performance information $y_1^2$), $C_3$ (inferred performance information $y_2^3$), $C_2$ (inferred performance information $y_m^2$) and $C_1$ (inferred performance information $y_M^1$) are respectively selected are generated in the unit periods $Q_1$, $Q_2$, $Q_m$ and $Q_M$.

The tendency generation unit 23 of the first embodiment generates the performance tendency $E_m$ according to a posterior probability p $(x_m|U_m, C_k)$ of the observed performance information $x_m$ being observed under the condition that the candidate tendency $C_k$ and the musical piece information S are provided. The posterior probability $p(x_m|U_m, C_k)$ is a conditional probability of the observed performance information $x_m$ being observed when a note that is specified by the unit information Um is performed based on the candidate tendency $C_k$. Specifically, the tendency generation unit 23, as represented by the following equation (2), selects the candidate tendency $C_k$ at which the posterior probability $p(x_m|U_m, C_k)$ is maximized, among the K types of candidate tendencies $C_1$ to $C_K$, as the performance tendency $E_m$ of the user. Note that the probability distribution of the posterior probability $p(x_m|U_m, C_k)$ is a normal distribution, for example. As is clear from the above description, the control device 11 of the first embodiment functions as an element (performance analysis unit) that specifies the performance tendency $E_m$ from observed performance information $x_m$ relating to the performance of a musical piece by a user.

$$E_m = \underset{k}{\operatorname{argmax}}\, p(x_m \mid U_m, C_k) \qquad (2)$$

Figure 6:
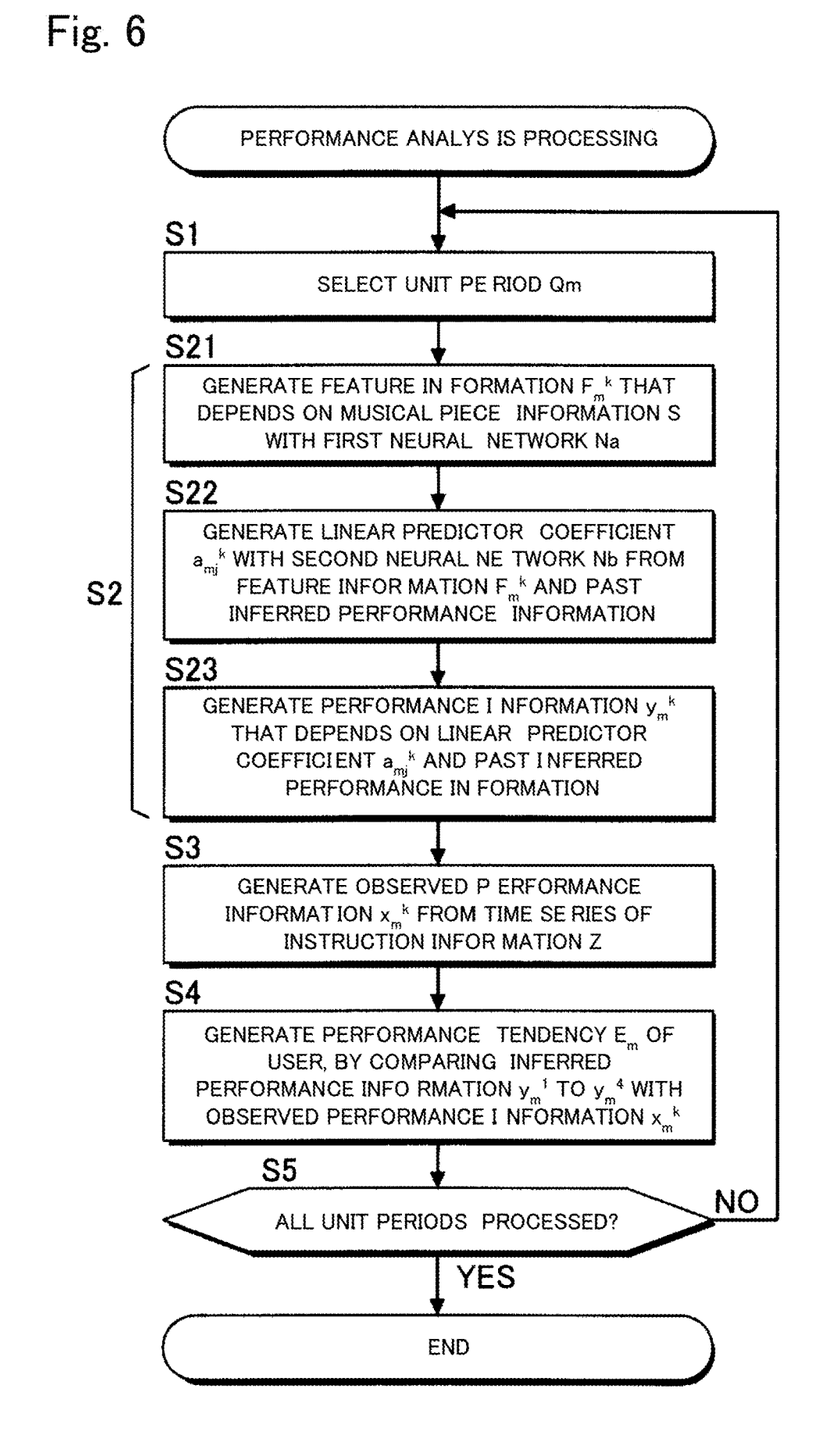
FIG. 6 is a flowchart showing the contents of performance analysis processing.

FIG. 5 is a flowchart illustrating the contents of processing (hereinafter, "performance analysis processing") for the control device 11 to infer the performance tendency $E_m$ of the user. The performance analysis processing of FIG. 6 is started when triggered by an instruction from a user to the performance analysis processing apparatus 100, for example.

When the performance analysis processing is started, the control device 11 selects the earliest unselected unit period $Q_m$ among the M unit periods $Q_1$ to $Q_M$ within the musical piece (S1). The control device 11 executes performance inference processing S2, performance observation processing S3, and tendency processing S4 for the unit period $Q_m$. The performance inference processing S2 is executed by the performance inference unit 21, the performance observation processing S3 is executed by the performance observation unit 22, and the tendency processing S4 is executed by the tendency generation unit 23. Note that the performance inference processing S2 may be executed after execution of the performance observation processing S3.

The performance inference processing S2 is processing (S21 to S23) for generating K pieces of inferred performance information $y_m^1$ to $y_m^K$ corresponding to the different candidate tendencies $C_k$ for the unit period $Q_m$, by providing the musical piece information S and the past P pieces of inferred performance information $y_{m-1}^k$ to $y_{m-P}^k$ to each neural network $N_k$. Note that at the stage at which the first unit period $Q_1$ within the musical piece is selected as the earliest unselected unit period, inferred performance information $y_0$ prepared as an initial value is provided to each neural network $N_k$ together with the musical piece information S.

Specifically, the coefficient generation unit 31 of the performance information generation unit $G_k$ generates, with the first neural network Na, feature information $F_m^k$ that depends on the plural pieces of unit information $U_{m-w}$ to $U_{m+w}$ corresponding to the analysis period $A_m$ surrounding the unit period $Q_m$ within the musical piece information S (S21). The coefficient generation unit 31 generates, with the second neural network Nb, a linear predictor coefficient $a_{mj}$ that depends on the feature information $F_m^k$ and the past P pieces of inferred performance information $y_{m-1}^k$ to $y_{m-P}^k$ (S22). The computational processing unit 32 then generates the inferred performance information $y_m^k$ of the unit period $Q_m$ from the linear predictor coefficient $a_{mj}^k$ and the past P pieces of inferred performance information $y_{m-1}^k$ to $y_{m-P}^k$ (S23).

The performance observation processing S3 is processing for generating the observed performance information $x_m$ of the unit period $Q_m$ from the time series of the plural pieces of instruction information Z that are output by the performance apparatus 13. The tendency processing S4 is processing for inferring the performance tendency $E_m$ of the user from the K pieces of inferred performance information $y_m^1$ to $y_m^K$ generated in the performance inference processing S2 and the observed performance information $x_m$ generated in the performance observation processing S3.

When the tendency processing S4 is executed, the control device 11 determines whether the above processing (S2 to S4) has been completed for all (M) of the unit periods $Q_1$ to $Q_M$ within the musical piece (S5). If there is an unprocessed unit period $Q_m$ (S5: NO), the control device 11 newly selects the unit period $Q_{m+1}$ immediately after the unit period $Q_m$ that is selected at the current point in time (S1), and executes the performance inference processing S2, the performance observation processing S3, and the tendency processing S4. On the other hand, when processing is completed for all the unit periods $Q_1$ to $Q_M$ within the musical piece (S5: YES), the control device 11 ends the performance analysis processing of FIG. 6. At the point in time at which the performance analysis processing is ended, performance tendencies $E_1$ to $E_M$ spanning the whole segment of the musical piece are generated.

As described above, in the first embodiment, it is possible to generate the performance tendency $E_m$ of the user from observed performance information $x_m$ relating to the performance of the musical piece by the user. In the first embodiment, each of the K pieces of inferred performance information $y_m^1$ to $y_m^K$ that occur when the musical piece is performed based on the different candidate tendencies $C_k$ is compared with the observed performance information $x_m$. Accordingly, one of the K types of candidate tendencies $C_1$ to $C_K$ can be generated as the performance tendency $E_m$ of the user.

According to the first embodiment, it is possible to appropriately generate inferred performance information $y_m^k$ that occurs when the musical piece is performed based on the candidate tendency $C_k$, by providing the musical piece information S of the musical piece to the neural network $N_k$ in which candidate tendency $C_k$ is reflected. Also, one of the K types of candidate tendencies $C_1$ to $C_K$ is generated as the performance tendency $E_m$ of the user, according to the posterior probability p $(x_m|U_m, C_k)$ of the inferred performance information $y_m^k$ being observed under the condition that the candidate tendency $C_k$ and the musical piece information S are provided. Accordingly, it is possible to appropriately generate a most likely performance tendency $E_m$ among the K types of candidate tendencies $C_1$ to $C_K$.

The following effects can thereby be obtained. For example, when driving another apparatus such as a video apparatus or a lighting apparatus in synchronization with the performance of the performance apparatus 13, the performance tendency $E_m$ can be provided to the other apparatus. Thus, the other apparatus is able to display video or control lighting, based on the performance tendency $E_m$. Accordingly, when synchronizing a performance and another apparatus, the occurrence of delays in driving the other apparatus can be prevented.

Also, in the case where, for example, a performance of a person is carried out in conjunction with an automatic performance by a machine, if the observed performance information $x_m$ can be acquired from the performance of the person and the performance tendency $E_m$ can be generated therefrom, the automatic performance can be performed based on the performance tendency $E_m$, thus enabling the combined performance of the performance of a person and the performance of a machine. That is, since the automatic performance can be carried out based on the performance tendency $E_m$ of the person, the occurrence of performance delays or the like can be prevented, and the performance speed (tempo) of the automatic performance can be reliably aligned with the performance of the person.

Second Embodiment

A second embodiment of the present invention will now be described. Note that, in the embodiments illustrated below, signs used in the description of the first embodiment will be used for elements whose operation or function is similar to the first embodiment, and a detailed description of those elements will be omitted as appropriate.

The tendency generation unit 23 of the first embodiment, as shown in equation (2) above, selects the candidate tendency $C_k$ at which the posterior probability $p(x_m|U_m, C_k)$ of the observed performance information $x_m$ being observed under the condition that the candidate tendency $C_k$ and the musical piece information S are provided is maximized as the performance tendency $E_m$ of the user. The tendency generation unit 23 of the second embodiment, as represented by the following equation (3), selects one of the K types of candidate tendencies $C_1$ to $C_K$ as the performance tendency $E_m$ of the user, according to the posterior probability $p(x_m|U_m, C_k)$ and an occurrence probability $\pi_k$ of the candidate tendency $C_k$.

$$E_m = \underset{k}{\mathrm{argmax}}\, p(x_m \mid U_m, C_k) \cdot \pi_k \qquad (3)$$

The occurrence probability $\pi_k$ is the probability of the candidate tendency $C_k$ occurring, and is individually set for every candidate tendency $C_k$. Specifically, the occurrence probability $\pi_k$ of a candidate tendency $C_k$ that is readily observed in the performance of a large number of performers is set to a large numerical value, and the occurrence probability $\pi_k$ of an atypical candidate tendency $C_k$ whose performers are limited in number is set to a small numerical value. For example, the provider of the performance analysis apparatus 100 appropriately sets the occurrence probability $\pi_k$ of each candidate tendency $C_k$, with reference to statistical material of the performance tendencies of the musical piece. Note that the occurrence probability $\pi_k$ of each candidate tendency $C_k$ may be set to a numerical value instructed by the user of the performance analysis apparatus 100.

As is clear from equation (3), the tendency generation unit 23 of the second embodiment selects, as the performance tendency $E_m$ of the user, the candidate tendency $C_k$ that maximizes the product of the posterior probability $p(x_m|U_m, C_k)$ and the occurrence probability $\pi_k$, among the K types of candidate tendencies $C_1$ to $C_K$. Accordingly, there is a tendency for a candidate tendency $C_k$ with a larger occurrence probability $\pi_k$ to be more readily selected as the performance tendency $E_m$ of the user.

Operations other than those of the tendency generation unit 23 are similar to the first embodiment. Accordingly, similar effects to the first embodiment are also realized in the second embodiment. Also, in the second embodiment, the occurrence probability $\pi_k$ of each candidate tendency $C_k$ is taken into consideration in generating the performance tendency $E_m$ in addition to the posterior probability $p(x_m|U_m, C_k)$. Accordingly, there is an advantage in that the performance tendency $E_m$ of the user can be inferred with high accuracy, based on the tendency of each of the K types of candidate tendencies $C_1$ to $C_K$ being readily observed in an actual performance situation.

Third Embodiment

Figure 7:
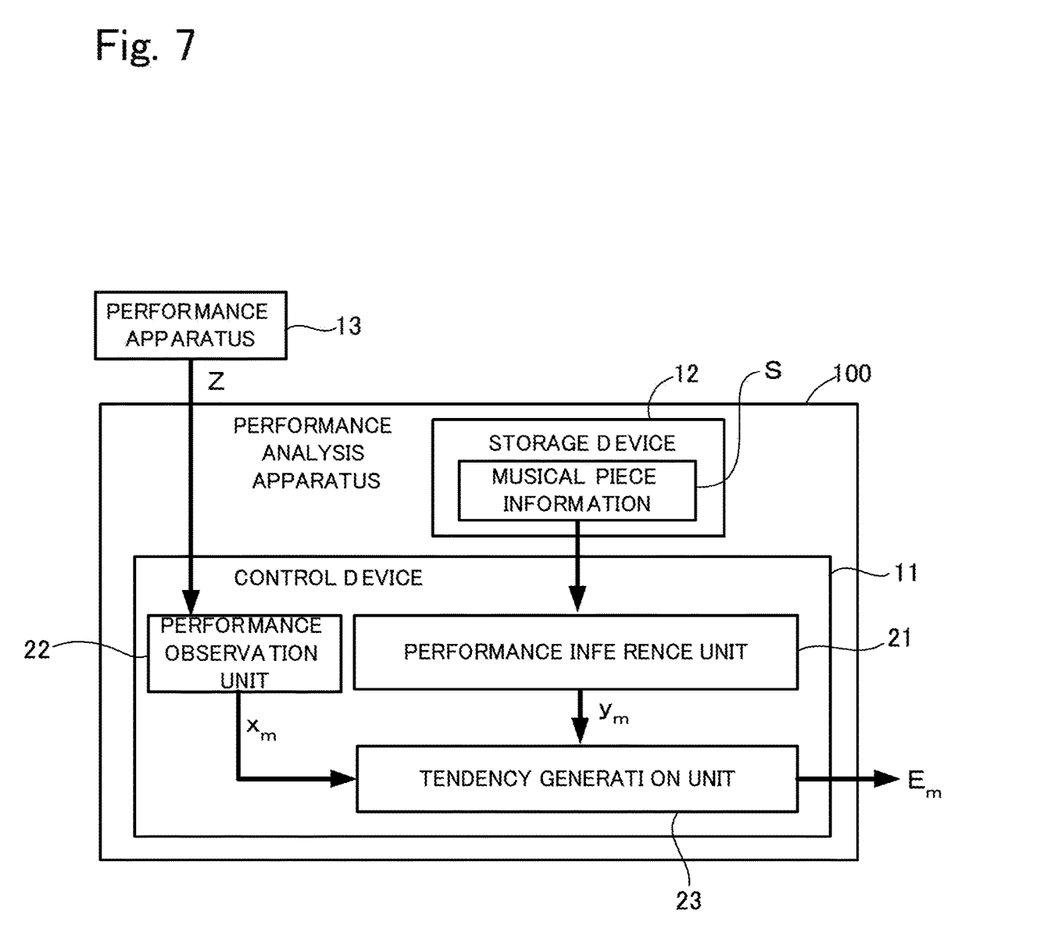
FIG. 7 is a block diagram showing a configuration of a performance analysis apparatus according to a third embodiment.

FIG. 7 is a block diagram showing a configuration of a performance analysis apparatus 100 in a third embodiment. As illustrated in FIG. 7, the performance inference unit 21 of the third embodiment generates, for every unit period $Q_m$, inferred performance information $y_m$ that occurs when a musical piece is performed based on a specific tendency (hereinafter, "reference tendency") $C_{REF}$ relating to a performance. Specifically, the performance inference unit 21 of the third embodiment has a similar configuration to any one of the performance information generation units $G_k$ in the first embodiment, and is equipped with a neural network N in which the reference tendency $C_{REF}$ is reflected. That is, the performance inference unit 21 generates, for the unit period $Q_m$, inferred performance information $y_m$ in which the reference tendency $C_{REF}$ is reflected, by providing the musical piece information S (plurality of unit information $U_{m-w}$ to $U_{m+w}$) and the past P pieces of inferred performance information $y_{m-1}$ to $y_{m-P}$ to the neural network N. The configuration and operations of the performance observation unit 22 are similar to the first embodiment.

The tendency generation unit 23 generates the performance tendency $E_m$ of the user, by comparing the inferred performance information $y_m$ generated by the performance inference unit 21 with the observed performance information $x_m$ generated by the performance observation unit 22. The performance tendency $E_m$ of the third embodiment is an index of the correlation (e.g., similarity) between the inferred performance information $y_m$ and the observed performance information $x_m$. That is, an evaluation value indicating the degree of approximation of a tendency of the performance of the user and the reference tendency $C_{REF}$ is generated as the performance tendency $E_m$. For example, if a tendency of a model performance is set as the reference tendency $C_{REF}$, the performance tendency $E_m$ can be used as an index of the skill level (closeness to the model performance) of the performance of the user.

As is clear from the above description, according to the third embodiment, an index of the relationship between the performance of the user and the reference tendency $C_{REF}$ can be generated as the performance tendency $E_m$. Accordingly, the performance tendency $E_m$ according to the third embodiment differs from the performance tendency $E_m$ according to the first and second embodiments. Note that, as is clear from the illustration of the third embodiment, a configuration that generates K pieces of inferred performance information $y_m^1$ to $y_m^K$ corresponding to different candidate tendencies $C_k$ and a configuration that selects one of K types of candidate tendencies $C_1$ to $C_K$ as the performance tendency $E_m$ of the user are not essential in the present embodiment.

Variations

Illustrated below are modes of specific variations that are appended to the modes illustrated above. Two or more modes freely selected from those illustrated below may be combined as appropriate as long as there are no mutual inconsistencies.

(1) In the configuration (first embodiment or second embodiment) for selecting one of K types of candidate tendencies $C_1$ to $C_K$ for every unit period $Q_m$, the candidate tendency $C_k$ that is selected as the performance tendency $E_m$ can be changed every unit period $Q_m$. On the other hand, the K types of candidate tendencies $C_1$ to $C_K$ include combinations that readily transition and combinations that do not readily transition. Taking the above circumstances into consideration, a configuration that takes a probability (hereinafter, "transition probability") τ of one of any two types of candidate tendencies $C_k$ transitioning to the other candidate tendency $C_k$ into consideration in generating the performance tendency $E_m$ is also favorable.

Specifically, the transition probability τ of one candidate tendency $C_{k1}$ of the combination transitioning to the other candidate tendency $C_{k2}$ is set for every combination obtained by selecting two types from the K types of candidate tendencies $C_1$ to $C_K$ (k1=1 to K, k2=1 to K). For example, the transition probability τ is set for all combinations obtained by selecting two types of candidate tendencies $C_k$ from the K types of candidate tendencies $C_1$ to $C_K$ while allowing duplication. The transition probability τ of the combination is set to a larger numerical value, as the likelihood of transitioning from the one candidate tendency $C_{k1}$ of the combination to the other candidate tendency $C_{k2}$ increases.

The tendency generation unit 23 selects one of the K types of candidate tendencies $C_1$ to $C_K$ as the performance tendency $E_m$ of the user, taking the transition probability τ into consideration in addition to the posterior probability $p(x_m | U_m, C_k)$. Specifically, the tendency generation unit 23 selects one of the K types of candidate tendencies $C_k$ as the as the performance tendency $E_m$, such that a candidate tendency $C_k$ having a higher probability τ of transitioning from the candidate tendency $C_k$ selected as the immediately pervious performance tendency $E_{m-1}$ is more readily selected as the performance tendency $E_m$ of the unit period $Q_m$. According to the above configuration, it is possible to transition the performance tendency $E_m$ with a natural combination that reflects the transition of tendencies in actual performances. Note in the performance tendency $E_m$ of the user may be generated, taking the occurrence probability $\pi_k$ of the second embodiment into consideration in addition to the posterior probability $p(x_m | U_m, C_k)$ and the transition probability τ.

(2) In the aforementioned embodiments, the analysis period $A_m$ centered on the unit period $Q_m$ is illustrated, but the relationship between the unit period $Q_m$ and the analysis period $A_m$ is not limited to that illustrated above. The number of unit periods within the analysis period $A_m$ that are located prior to the unit period $Q_m$ may be different from the number of unit periods located thereafter.

(3) For example, it is also possible to realize the performance analysis apparatus 100 with a server apparatus that communicates with a terminal apparatus (e.g., mobile phone or smartphone) via a communication network such as a mobile communication network or the Internet. Specifically, the performance analysis apparatus 100 sequentially generates the performance tendency $E_m$ from instruction information Z and musical piece information S received from the terminal apparatus, and transmits the performance tendencies $E_m$ to the terminal apparatus. Note that, in a configuration in which observed performance information $x_m$ generated by a performance observation unit 22 within the terminal apparatus is transmitted from the terminal apparatus to the performance analysis apparatus 100, the performance observation unit 22 is omitted from the performance analysis apparatus 100.

(4) In the aforementioned embodiments, the performance speed of the musical piece is illustrated as the inferred performance information $y_m^k$, but the variable that is represented by the inferred performance information $y_m^k$ is not limited to that illustrated above. For example, any variable relating to a musical expression that can differ by performer, such as the performance intensity of the musical piece, can be utilized as the inferred performance information $y_m^k$. The observed performance information $x_m$ is similarly not limited to performance speed. That is, various types of variables (e.g., performance intensity) relating to musical expressions can be utilized as the observed performance information $x_m$.

(5) In the above embodiments, the neural network N is divided in two, but can also be used as one. That is, the inferred performance information $y_m^k$ of the next unit period $Q_m$ can also be predicted with one neural network N, from the musical piece information S and the past inferred performance information $y_{m-1}^k$ to $y_{m-P}^k$. Also, the first neural network Na is used in order to extract the feature information $F_m^k$ from the musical piece information S, but the feature information $F_m^k$ can also be extracted by analyzing the musical piece information S, without using a neural network.

(6) In the above embodiments, the inferred performance information $y_m^k$ of the unit period $Q_m$ is predicted by using a neural network, but a learner constituted by a support vector machine, a self-organizing map or a learner that learns by reinforcement learning, for example, can be used as the learner that performs such prediction, apart from the above neural network.

(7) The following configurations, for example, can be appreciated from the embodiments illustrated above.

Mode 1

A performance analysis method according to a favorable mode (mode 1) of the present invention, in which a computer generates a performance tendency of a user, from observed performance information relating to a performance of a musical piece by the user and inferred performance information that occurs when the musical piece is performed based on a specific tendency. According to the above mode, it is possible to generate a performance tendency of a user from observed performance information relating to a performance of a musical piece by the user.

Mode 2

In a favorable example (mode 2) of mode 1, generation of the performance tendency includes performance inference processing for generating, for each of a plurality of different candidate tendencies, inferred performance information that occurs when the musical piece is performed based on the candidate tendency, and tendency processing for generating one of the plurality of candidate tendencies as the performance tendency of the user, by comparing each of the plural pieces of inferred performance information respectively generated for the plurality of candidate tendencies with the observed performance information. In the above mode, each of plural pieces of inferred performance information that occur when a musical piece is performed based on different candidate tendencies is compared with observed performance information. Accordingly, it is possible to generate one of the plurality of candidate tendencies as the performance tendency of the user.

Mode 3

In a favorable example (mode 3) of mode 2, in the performance inference processing, the inferred performance information is generated, by providing, for each of the plurality of candidate tendencies, musical piece information representing contents of the musical piece to a neural network in which the candidate tendency is reflected. In the above mode, it is possible to appropriately generate inferred performance information that occurs when the musical piece is performed based on a candidate tendency, by providing musical piece information to a neural network in which the candidate tendency is reflected.

Mode 4

In a favorable example (mode 4) of mode 2 or 3, in the tendency processing, one of the plurality of candidate tendencies is generated as the performance tendency of the user, according to a posterior probability of the observed performance information being observed under a condition that each of the candidate tendencies and the musical piece information are provided. According to the above mode, it is possible to appropriately generate a most likely performance tendency among the plurality of candidate tendencies.

Mode 5

In a favorable example (mode 5) of mode 4, in the tendency processing, one of the plurality of candidate tendencies is generated as the performance tendency of the user, according to the posterior probability corresponding to each of the candidate tendencies and an occurrence probability of the candidate tendency. According to the above mode, there is an advantage in that a performance tendency of a user can be inferred with high accuracy, based on the tendency of whether each of a plurality of candidate tendencies is readily observed in an actual performance situation, for example.

Mode 6

In a favorable example (mode 6) of mode 1, generation of the performance tendency includes performance inference processing for generating inferred performance information that occurs when the musical piece is performed based on the specific tendency, and tendency processing for generating the performance tendency of the user by comparing the inferred performance information with the observed performance information. According to the above mode, an index of the relationship between a performance of a user and a specific tendency can be generated as the performance tendency.

Mode 7

A program according to a favorable mode (mode 7) of the present invention causes a computer to function as a performance analysis unit that generates a performance tendency of a user, from observed performance information relating to a performance of a musical piece by the user and inferred performance information that occurs when the musical piece is performed based on a specific tendency. According to the above mode, it is possible to generate the performance tendency of a user from observed performance information relating to a performance of a musical piece by the user.

The program according to mode 7 is provided in the form of storage in a computer-readable recording medium and is installed on a computer, for example. The recording medium is, for example, a non-transitory recording medium, favorable examples of which include an optical recording medium (optical disk) such as a CD-ROM, and can encompass a recording medium of any known format such as a semiconductor recording medium or magnetic recording medium. Note that non-transitory recording media include any recording media excluding transitory propagating signals, and do not preclude volatile recording media. Also, the program may be provided to a computer in the form of distribution via a communication network.

REFERENCE SIGNS LIST

100 Performance analysis apparatus
11 Control apparatus
12 Storage apparatus
13 Performance apparatus
21 Performance inference unit
22 Performance observation unit
23 Tendency generation unit
31 Coefficient generation unit

The invention claimed is:

1. A performance analysis method for musical piece information containing a plurality of pieces of unit information representing contents of a musical piece, the method comprising:
   generating a plurality of pieces of inferred performance information corresponding to a plurality of different candidate tendencies, for each unit period of a plurality of unit periods in the musical piece information, from the musical piece information using first and second neural networks by, for each of the plurality of different candidate tendencies:
      generating, with the first neural network, feature information based on pieces of unit information, from among the plurality of pieces of unit information, included in a predetermined analysis period, which includes a current unit period;
      generating, with the second neural network, a linear predictor coefficient based on the generated feature information and past pieces of inferred performance information from a previous unit period; and
      calculating the inferred performance information from the generated linear predictor coefficient and the past pieces of inferred performance information;
   generating, for each unit period, observed performance information from a time series of plural pieces of instruction information output by a performance apparatus, the observed performance information being a variable relating to a tendency of a performance of the musical piece; and
   generating, for each unit period, performance tendency information related to a performance tendency of a user from the generated plurality of pieces of inferred performance information and the generated observed performance information by comparing each of the plurality of pieces of inferred performance information respectively generated for the plurality of different candidate tendencies with the generated observed performance information.

2. The performance analysis method according to claim 1, wherein one candidate tendency of the plurality of candidate tendencies is taken as the performance tendency of the user according to a posterior probability of the observed performance information being observed in a state where each of the plurality of candidate tendencies and the musical piece information are provided.

3. The performance analysis method according to claim 2, wherein the one candidate tendency is taken as the performance tendency of the user according to the posterior probability corresponding to each of the plurality of candidate tendencies and an occurrence probability of the one candidate tendency.

4. A performance analysis apparatus comprising:
a storage unit storing musical piece information containing a plurality of pieces of unit information representing contents of a musical piece; and
a control unit including at least one processor, configured to:
generate a plurality of pieces of inferred performance information corresponding to a plurality of different candidate tendencies, for each unit period of a plurality of unit periods in the musical piece information, from the musical piece information using first and second neural networks by, for each of the plurality of different candidate tendencies by, and for each of the plurality of different candidate tendencies that:
generates, with the first neural network, feature information based on pieces of unit information, from among the plurality of pieces of unit information, included in a predetermined analysis period, which includes a current unit period;
generates, with the second neural network, a linear predictor coefficient based on the generated feature information and past pieces of inferred performance information from a previous unit period; and
calculates the inferred performance information from the generated linear predictor coefficient and the past pieces of inferred performance information;
generate, for each unit period, observed performance information from a time series of plural pieces of instruction information output by a performance apparatus, the observed performance information being a variable relating to a tendency of a performance of the musical piece; and
generate, for each unit period, performance tendency information related to a performance tendency of a user from the generated plurality of pieces of inferred performance information and the generated observed performance information by comparing each of the plurality of pieces of inferred performance information respectively generated for the plurality of different candidate tendencies with the generated observed performance information.

5. A non-transitory storage medium storing a program executable by a computer to execute a performance analysis method for musical piece information containing a plurality of pieces of unit information representing contents of a musical piece, the method comprising:
generating a plurality of pieces of inferred performance information corresponding to a plurality of different candidate tendencies, for each unit period of a plurality of unit periods in the musical piece information, from the musical piece information using first and second neural networks by, for each of the plurality of different candidate tendencies:
generating, with the first neural network, feature information based on pieces of unit information, from among the plurality of pieces of unit information, included in a predetermined analysis period, which includes a current unit period;
generating, with the second neural network, a linear predictor coefficient based on the generated feature information and past pieces of inferred performance information from a previous unit period; and
calculating the inferred performance information from the generated linear predictor coefficient and the past pieces of inferred performance information; and
generating, for each unit period, observed performance information from a time series of plural pieces of instruction information output by a performance apparatus, the observed performance information being a variable relating to a tendency of a performance of the musical piece;
generating, for each unit period, performance tendency information related to a performance tendency of a user from the generated plurality of pieces of inferred performance information and the generated observed performance information by comparing each of the plurality of pieces of inferred performance information respectively generated for the plurality of different candidate tendencies with the generated observed performance information.

* * * * *